(12) United States Patent
Baker et al.

(10) Patent No.: US 9,204,457 B2
(45) Date of Patent: *Dec. 1, 2015

(54) RESOURCE ALLOCATION IN A COMMUNICATION NETWORK

(71) Applicants: KONINKLIJKE PHILIPS N.V., Eindhoven (NL); SHARP KABUSHIKI KAISHA, Osaka (JP)

(72) Inventors: Matthew Baker, Canterbury (GB); Timothy Moulsley, Caterham (GB); Milos Tesanovic, Harrow (GB)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/540,099

(22) Filed: Nov. 13, 2014

(65) Prior Publication Data

US 2015/0071224 A1    Mar. 12, 2015

Related U.S. Application Data

(63) Continuation of application No. 13/381,110, filed as application No. PCT/IB2010/052842 on Jun. 23, 2010, now Pat. No. 8,908,549.

(30) Foreign Application Priority Data

Jun. 29, 2009  (EP) .................................. 09164074

(51) Int. Cl.
*H04W 4/00* (2009.01)
*H04W 72/08* (2009.01)
*H04W 72/12* (2009.01)

(52) U.S. Cl.
CPC ........ *H04W 72/085* (2013.01); *H04W 72/1221* (2013.01); *H04W 72/1252* (2013.01); *H04W 72/1257* (2013.01)

(58) Field of Classification Search
CPC .................................................... H04W 72/085
USPC ................................................... 370/252, 253
See application file for complete search history.

(56) References Cited

U.S. PATENT DOCUMENTS

| 7,181,666 | B2 | 2/2007 | Grob et al. |
|---|---|---|---|
| 7,212,507 | B2 | 5/2007 | Wang et al |
| 7,724,640 | B2 | 5/2010 | Larsson |
| 7,953,003 | B2 | 5/2011 | Moulsley et al. |
| 2003/0123477 | A1 | 7/2003 | Gollamudi et al. |
| 2004/0027991 | A1 | 2/2004 | Jang et al. |
| 2005/0220215 | A1 | 10/2005 | Tanabe et al. |
| 2006/0045032 | A1 | 3/2006 | Hamada |
| 2007/0168826 | A1 | 7/2007 | Terry et al. |
| 2007/0297325 | A1 | 12/2007 | Larsson |

(Continued)

FOREIGN PATENT DOCUMENTS

| GB | 2453979 A | 4/2009 |
|---|---|---|
| JP | 2008167141 A | 7/2008 |

*Primary Examiner* — Farah Faroul

(57) ABSTRACT

The present invention relates to a method for operating a network comprising a primary station communicating with a plurality of secondary stations, the method comprising the primary station communicating with a secondary station in a discontinuous mode; the secondary station transmitting to the primary station a control message based on the current status of the secondary station; and the primary station changing a parameter of the discontinuous mode based on the control message.

20 Claims, 2 Drawing Sheets

(56) References Cited

U.S. PATENT DOCUMENTS

| | | |
|---|---|---|
| 2008/0095055 A1 | 4/2008 | Moulsley et al. |
| 2008/0159337 A1 | 7/2008 | Lee |
| 2009/0310493 A1* | 12/2009 | Nogami ........................ 370/252 |
| 2010/0238835 A1 | 9/2010 | Lundgren et al. |
| 2010/0302960 A1 | 12/2010 | Bjorken et al. |
| 2011/0002278 A1 | 1/2011 | Lindoff et al. |
| 2011/0195681 A1* | 8/2011 | Osterling ................... 455/127.1 |
| 2012/0250678 A1 | 10/2012 | Sabella et al. |

* cited by examiner

FIG1  - - PRIOR ART - -

RESOURCE ALLOCATION IN A COMMUNICATION NETWORK

CLAIM OF PRIORITY

The present application claims, pursuant to 35 USC 120, priority to and the benefit of the earlier filing data of that patent application filed on Dec. 28, 2011 and afforded Ser. No. 13/381,110 (now U.S. Pat. No. 8,908,549), which claimed priority, as a National Stage filing of International patent application filed on Jun. 23, 2010 and afforded serial number PCT/IB10/52842, which claimed priority to European Patent Application, filed on Jun. 29, 2009 and afforded serial number 09164074.8, the contents of all of which incorporated by reference, herein.

FIELD OF THE INVENTION

The present invention relates to a method for communicating in a network. More specifically, the present invention relates to communication between a primary station and a secondary station, in a telecommunication network, like a cellular telecommunication network (e.g. UMTS, UMTS LTE, GSM).

BACKGROUND OF THE INVENTION

In wireless packet-data networks with centralized control, a mechanism is required to enable a base station (or eNB in UMTS LTE terminology) to prioritize effectively the allocation of uplink transmission resources between different mobile terminals (user terminals, or UEs, in UMTS LTE). As disclosed on FIG. 1, a primary station 100 being, for example, a base station in UMTS or a Node B (eNB) in LTE communicates by means of a plurality of channels 120 with a plurality of secondary stations 101 being, for example, a mobile station in UMTS or User Equipment (UE) in LTE. Each channel 120 may be dedicated to carry different kind of data like control data or user data. Each secondary station 101 typically has data queued in buffers until it can transmit, when a resource is granted by the primary station; there may be buffers for a number of different streams, each with a different quality of service (QoS) requirement as shown on FIG. 2. As can be seen on the diagram of FIG. 2, three buffers or queues 21, 22 and 23 are shown. For each queue, a corresponding Quality of Service requirement is set, requiring a level of Quality of Service, for example to limit the delay of transmission or requiring regular transmissions at a minimal given interval. The eNB needs information to enable it to decide which UEs should be granted to transmit, and at what rate. To assist in this process, it is known for the UE to transmit requests for permission (so-called scheduling requests, or SRs), as well as the indication of the data in its buffers (namely buffer status reports, BSRs).

In the state-of-the-art, the threshold for triggering these events on the uplink is usually predetermined, or based on instantaneous channel and/or buffer occupancy conditions. Existing enhancements include methods which take into account the most recently granted data rate, or the average of the recently granted data rates. A UE can in fact store and analyse more details of its past transmission history, thereby extracting more accurate predictions of whether QoS targets are likely to be met.

SUMMARY OF THE INVENTION

It is an object of the invention to propose a method which alleviates the above problems.

It is another object of the invention to propose a method which provides more flexibility to the signaling of the secondary station.

In accordance with a first aspect of the invention, it is proposed a method of operating a communication system including a primary station communicating with at least one secondary station, the method comprising queuing at least one data unit in a secondary station buffer, estimating the time needed to deliver the at least one data unit with a predetermined probability of success, and, if the estimated time exceeds a given threshold, generating a resource signal.

In accordance with a second aspect of the invention, it is proposed a secondary station comprising means for communicating in a network including a primary station, the secondary station comprising at least one buffer for queuing at least one data unit, and control means for estimating the time needed to deliver the at least one data unit with a predetermined probability of success, and, transmission means for, if the estimated time exceeds a given threshold, generating a resource signal.

In accordance with a third aspect of the invention, it is proposed a primary station comprising means for communicating with at least one secondary station, the primary station comprising control means for estimating the time needed for the secondary station to deliver at least one data unit stored in a buffer of the secondary station with a predetermined probability of success, the control means being arranged for generating a resource signal, if the estimated time exceeds a given threshold.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
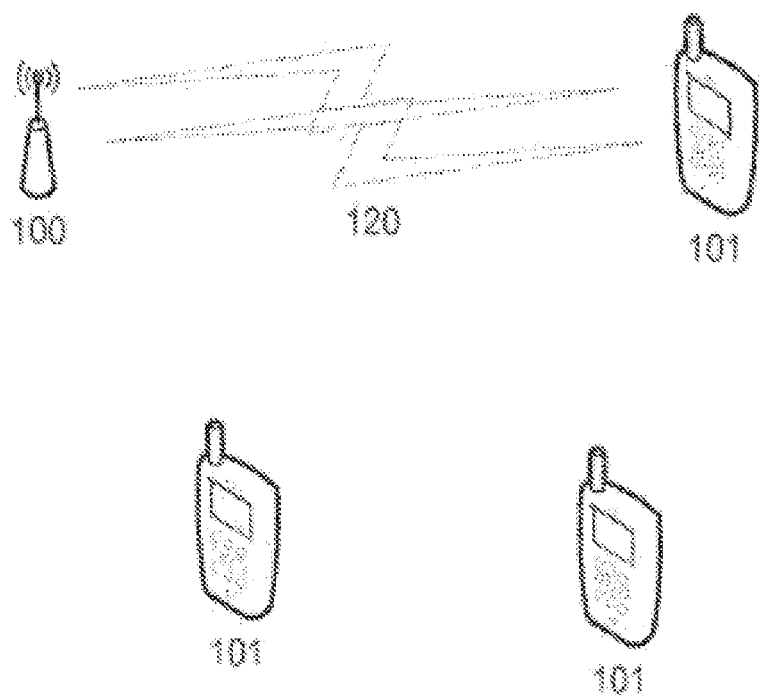
FIG. 1 is a diagram of a network in which the invention can be implemented.
Figure 2:
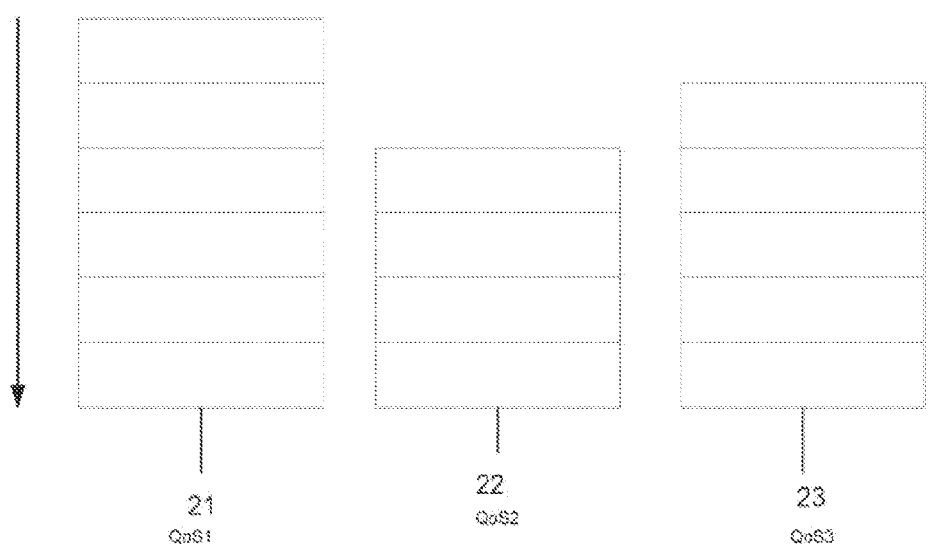
FIG. 2 represents queues for storing data packets in the secondary station before transmission.

This invention defines a set of rules for triggering signaling events on the uplink of a wireless communication system. The events in question are related to the information a central entity in such a network requires from mobile terminals in order to make accurate scheduling decisions and include:

The scheduling request itself;
Buffer status report;
Request for transmission at a particular rate or of a particular logical channel, priority, application.

The rules laid down in this invention enable the threshold used to trigger such events to be determined based on a combination of factors. These factors take into account the statistics of the past transmission history. The threshold is then either computed in the mobile terminal, or in the central scheduling entity and then signalled to the mobile terminal.

The proposed solution to the problems above is to enhance the range of possible triggers. More detailed statistical analysis of the triggering thresholds of above, and/or the introduction of additional thresholds, would yield a more efficient use of resources. The signaling of an SR or a BSR could potentially be triggered by a number of new events, for example the time needed to deliver a packet with a predetermined probability of success and/or the expected response time to the event triggered.

In particular, the invention considers the probability that a packet can be transmitted within a particular time (for example a latency threshold set by QoS requirements of the application from which the data packets originated), instead of the average or instantaneous time which is predicted to elapse before successful transmission.

An implementation of the invention can derive the probability of successful transmission within a particular time from consideration of the statistics of previous (H)ARQ transmissions and retransmissions.

The computations can be carried out over a sliding window of past scheduling instants, with the update rate of computation the same or less than the scheduling interval.

The invention allows an important contributor (namely (H)ARQ retransmission delay) to total transmission delay to be taken into account when deciding whether to trigger a SR or BSR event. This represents an improvement over the prior art (such as PHGB050012), which only considers delay already spent in the buffer and predicted delay waiting for first transmission, but not predicted delay for HARQ retransmissions or probability of successful transmission within a target time period.

In accordance with a first embodiment of the invention, it is proposed a method of operating a communication system, the method comprising of queuing data units in UE buffers, estimating the time needed to deliver packets with a predetermined probability of success (e.g. 98%), either in the UE itself or in the eNB, and, if the estimated time exceeds a given threshold, generating appropriate signaling (SR and/or BSR) to the eNB.

Thus, if there is a high transmission failure rate, it will likely require one or several retransmissions of the data packets, and the time needed to deliver a packet will be long.

Advantageously, the time needed to deliver packets is estimated based on a certain characteristic of the (H)ARQ processes in a UE. The possible candidates include:
  a. The number of the HARQ retransmissions for the most recent transmission;
  b. The average number of the HARQ retransmissions for the most recent transmissions (or a weighted average, e.g. calculated using a forgetting factor). In case of forgetting factor, it means that the contribution in the computation of the average of old transmissions is less than the contribution of more recent transmissions. This can be done for example by having factor being less than 1 weighting the transmission time of old transmissions. These factors may also be dependent over the time and further decrease with the time;
  c. A certain parameter of the probability density function (pdf) of the number of HARQ retransmissions.

In accordance with this embodiment, the step of estimating the time is carried out in the primary station or the Node B and the signaling is a resource grant which indicates to the secondary station that a resource has been allocated to the secondary station. In a variant, the resource grant may specify which resource out of a set of resources has been allocated.

In a variant of this embodiment, the estimation of the time needed to transmit the data packet with a predetermined probability is based on a characteristic of a probability density function of the number of ARQ retransmissions.

wherein the time needed to deliver the at least one data unit is estimated based on the probability density function of transmission rate.

It is to be noted that the time needed to deliver the at least one data unit may be estimated with consideration of the time already spent in the secondary station buffer, or with an estimation of the time interval expected before transmission of the data unit starts, and/or with consideration of the expected response time to the resource signal.

Given that each data unit may have different priority or QoS requirement, the estimation of the interval expected before transmission of the data unit starts is made on the basis of the amount of further data units having a higher priority queued in the secondary station.

In response to the buffer report or the resource request, the primary station may send a resource grant for allocating of transmission resources or signal a change in the allocated transmission resources, for example, if semi persistent scheduling is used, to have a change in how frequent the semi persistently scheduled resources are.

In all of the variant discussed above, the primary station may signal the threshold. Moreover, the threshold may be different from a secondary station to another dependent on the respective priorities of the secondary stations or on the transmission conditions each secondary station is currently experiencing to avoid too frequent resource requests.

In a variant of the invention, the time needed to deliver packets is estimated based on the pdf of granted rate.

In another variant of the invention, it is proposed that the time needed to deliver packets is estimated with consideration of the total time already spent in the buffer, to determine the total delay.

In still another aspect of the invention, the time needed to deliver packets is estimated with consideration of the predicted length of time before transmission of the data starts, to determine the total delay. This estimation can be made based on e.g. the amount of other data of higher priority already buffered.

It is to be noted that sometimes that the time needed to deliver packets is estimated with consideration of the expected response time to the event being triggered.

In such a case, the response to the triggered event is the allocation of transmission resources or a change in the allocated transmission resources.

Other Embodiments

As an example, a trigger criterion according to the invention could be calculated as:

(number of packets in queue, e.g. for a particular logical channel)×(predicted number of retransmissions)×(number of hops if relaying is used)divided by [(granted transmission rate)×((H)ARQ RTT)]

If the criterion is calculated at the centralized scheduler (e.g. the eNB), the criterion could for example be signaled for each logical channel, or for each priority class, or for each application, or for each UE, or broadcast in a cell.

The invention may be applicable to cellular packet communication systems, mobile telecommunication systems like UMTS LTE and UMTS LTE-Advanced, or other networks implementing discontinuous reception or transmission.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

What is claimed is:

1. A secondary station for use in a communication network, the secondary station comprising:
   a transceiver; and
   a processor in communication with the transceiver, the processor executing the steps of:
      receiving data units through the transceiver,
      storing the received data units in a corresponding buffer, each of the buffers having an associated quality of service requirement,
      recording a history of transmitting data units in corresponding buffers,
      estimating a time needed to transmit at least one data unit associated with a corresponding buffer within a predetermined probability of success associated with the quality of service requirement, wherein the estimated time being determined based on weighting the history of past transmissions of data units in corresponding buffers;
      determining whether the estimated time exceeds a threshold value; and
      generating a resource signal after determining the estimated time exceeds the threshold value.

2. The second station of claim 1, wherein the quality of service requirement is based on a latency threshold.

3. The secondary station of claim 1, the weighting represents a sliding window over the history of past transmissions.

4. The secondary station of claim 1, wherein the weighting includes a forgetting factor, the forgetting factor weighting being less than one (<1).

5. The secondary station of claim 1, wherein the resource is one of: a Scheduling Request (SR) and a Buffer Status Report (BSR).

6. The secondary station of claim 1, wherein the processor further comprising:
   receiving the threshold value.

7. The secondary station of claim 1, wherein the estimating a time comprises:
   considering a time the data is in the corresponding buffer.

8. The secondary station of claim 1, wherein the estimating a time comprises:
   considering a probability density function of a granted rate of responses to a corresponding request.

9. The secondary station of claim 1, wherein the estimated time comprises:
   considering at least one of: a number of packets in a corresponding buffer, a predicted number of retransmissions, a number of hops, and a granted transmission rate.

10. A primary station in a network communicating with a secondary station, the primary station comprising:
    a transceiver; and
    a processor in communication with the transceiver, the processor:
       storing received transmission from the secondary station associated with data units from a corresponding buffer;
       estimating a time need for the secondary station to deliver at least one data unit stored in the corresponding buffer with a predetermined probability of success, wherein the estimation of time is based on a decreasing weighted past receiving history of transmissions from the secondary station over time; and
       determining whether the estimated time exceeds a threshold value; and
       generating a resource signal after determining the estimated time exceeds the threshold value.

11. The primary station of claim 10, wherein the weighting represents a sliding window over the history of past transmissions.

12. The primary station of claim 10, wherein the weighting includes a forgetting factor, the forgetting factor weighting being less than one (<1).

13. The primary station of claim 10, wherein the resource is one of: a Scheduling Request (SR) and a Buffer Status Report (BSR).

14. A secondary station operable in a communication network, the secondary station comprising:
    a transceiver; and
    a processor in communication with the transceiver, the processor executing the steps of:
       receiving data units from a primary station through the transceiver,
       storing the received data units in a corresponding buffer, each of the buffers having an associated quality of service requirement,
       estimating a time needed to transmit at least one data unit associated with a corresponding buffer within a predetermined probability of success associated with the quality of service requirement, the estimated time being determined based on a history of past transmissions of data units in a corresponding buffer, wherein a contribution of the past transmission values is altered over time;
       receiving a threshold value associated with a corresponding one of the buffers;
       determining whether the estimated time exceeds the threshold value associated with a corresponding one of the buffers; and
       generating a resource signal after determining the estimated time exceeds the threshold value.

15. The secondary station of claim 14, wherein the contribution of past transmission values is weighted.

16. The secondary station of claim 15, wherein the weighting decreases over time.

17. The secondary station of claim 15, wherein weighting includes a forgetting factor.

18. The secondary station of claim 17, wherein the forgetting factor has a weight less than 1.

19. The secondary station of claim 14, wherein weighting represents a sliding window over the history of past transmissions.

20. The secondary station of claim 14, wherein the resource grant is one of: a Scheduling Request (SR) and a Buffer Status Report (BSR).

* * * * *